(12) United States Patent
Belge et al.

(10) Patent No.: US 8,559,489 B2
(45) Date of Patent: *Oct. 15, 2013

(54) SYSTEMS AND METHODS FOR CHARACTERIZING TRANSMISSION LINES USING BROADBAND SIGNALS IN A MULTI-CARRIER DSL ENVIRONMENT

(75) Inventors: Murat Belge, Malden, MA (US); Michael A. Tzannes, Lexington, MA (US); Halil Padir, N. Andover, MA (US)

(73) Assignee: Aware, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,329

(22) Filed: May 4, 2012

(65) Prior Publication Data

US 2012/0263216 A1   Oct. 18, 2012

Related U.S. Application Data

(63) Continuation of application No. 12/756,841, filed on Apr. 8, 2010, now Pat. No. 8,208,519, which is a continuation of application No. 11/404,823, filed on Apr. 17, 2006, now Pat. No. 7,773,666, which is a continuation of application No. 09/925,509, filed on Aug. 10, 2001, now abandoned.

(60) Provisional application No. 60/224,308, filed on Aug. 10, 2000.

(51) Int. Cl.
*H04B 1/38* (2006.01)
*H04L 5/16* (2006.01)

(52) U.S. Cl.
USPC .......................................... 375/222

(58) Field of Classification Search
USPC .......................................... 375/222
See application file for complete search history.

(56) References Cited

U.S. PATENT DOCUMENTS

| | | | |
|---|---|---|---|
| 4,731,816 | A | 3/1988 | Hughes-Hartogs |
| 5,128,619 | A | 7/1992 | Bjork et al. |
| 5,479,447 | A | 12/1995 | Chow et al. |
| 5,864,602 | A | 1/1999 | Needle |

(Continued)

FOREIGN PATENT DOCUMENTS

| | | |
|---|---|---|
| AU | 57081/01 | 10/2011 |
| CA | 2225754 | 1/1997 |

(Continued)

OTHER PUBLICATIONS

Notice of Allowance (including translation) for Korean Patent Application No. 10-2006-7025782, mailed Nov. 20, 2012.

(Continued)

*Primary Examiner* — Curtis Odom
(74) *Attorney, Agent, or Firm* — Jason H. Vick; Sheridan Ross, PC

(57) ABSTRACT

Using DSL modems as data collectors, the modems processes the data to, for example, allow easier interpretation of the line characteristics. In particular, the modems postprocess the data including calibration, filter compensation, determination of the SNR medley from the bits and gains tables and rate conversion. The interpretation process uses the postprocessed data and determines loop characterization, interferer detection, a data reduction estimation and a data rate estimation. The outputs of these determinations least allow for the characterization of the line conditions between the two modems.

15 Claims, 14 Drawing Sheets

(56) References Cited

U.S. PATENT DOCUMENTS

| | | | |
|---|---|---|---|
| 5,966,387 A | | 10/1999 | Cloutier |
| 6,014,425 A | * | 1/2000 | Bingel et al. ............... 379/26.02 |
| 6,075,821 A | | 6/2000 | Kao et al. |
| 6,188,717 B1 | | 2/2001 | Kaiser et al. |
| 6,263,048 B1 | | 7/2001 | Nelson et al. |
| 6,347,217 B1 | | 2/2002 | Bengtsson et al. |
| 6,606,719 B1 | | 8/2003 | Ryckebusch et al. |
| 6,633,545 B1 | * | 10/2003 | Milbrandt .................... 370/252 |
| 6,650,697 B1 | | 11/2003 | Tate et al. |
| 6,658,052 B2 | | 12/2003 | Krinsky et al. |
| 6,738,418 B1 | | 5/2004 | Stiscia et al. |
| 6,865,221 B2 | | 3/2005 | Belge |
| 6,947,441 B1 | | 9/2005 | Milbrandt |
| 6,985,444 B1 | | 1/2006 | Rosen |
| 7,773,666 B2 | * | 8/2010 | Belge et al. .................. 375/222 |
| 8,208,519 B2 | * | 6/2012 | Belge et al. .................. 375/222 |
| 2002/0009155 A1 | | 1/2002 | Tzannes |
| 2002/0114383 A1 | | 8/2002 | Belge et al. |
| 2010/0195708 A1 | | 8/2010 | Belge et al. |

FOREIGN PATENT DOCUMENTS

| | | |
|---|---|---|
| EP | 0889615 | 1/1999 |
| EP | 0987852 | 3/2000 |
| EP | 1071269 | 1/2001 |
| GB | 2303032 | 2/1997 |
| JP | 2000-013343 | 1/2000 |
| WO | WO 97/01900 | 1/1997 |
| WO | WO 99/20027 | 4/1999 |
| WO | WO 99/26365 | 5/1999 |
| WO | WO 99/26375 | 5/1999 |
| WO | WO 99/53637 | 10/1999 |
| WO | WO 99/63427 | 12/1999 |
| WO | WO 00/64130 | 10/2000 |

OTHER PUBLICATIONS

"ITU-T Recommendation G.992.1" International Telecommunication Union, Jun. 1999, 256 pages.
"ITU-T Recommendation G.992.2" International Telecommunication Union, Jun. 1999, 179 pages.
Boets et al., "The Modeling Aspect of Transmission Line Networks" Proceedings Of The Instrumentation and Measurement Technology Conference, US, New York, IEEE, May 12, 1992, pp. 137-141, XP000343913 ISBN: 0-7803-0640-6.
Cioffi, "ADSL Maintenance with DMT", T1E1.4 ADSL Project, Amati Communications Corporation, Dec. 1, 1992, pp. 1-14.
Cioffi, "Very high speed digital subscriber lines," IEEE Communications Magazine, Apr. 1999, pp. 72-79.
Lewis et al., "Extending Trouble Ticket Systems To Fault Diagnostics" IEEE Network, Nov. 1993, pp. 44-51, XP 000575228.
International Search Report for International (PCT) Patent Application No. PCT/US01/41653, mailed Oct. 9, 2002.
Written Opinion for International (PCT) Patent Application No. PCT/US01/41653, mailed Oct. 9, 2002.
International Preliminary Examination Report for International (PCT) Patent Application No. PCT/US01/41653, mailed Jan. 10, 2003.
Examiner's First Report for Australian Patent Application No. 2001285426, dated Oct. 12, 2005.
Examiner's First Report for Australian Patent Application No. 2007203099, dated Mar. 10, 2009.
Examiner's First Report for Australian Patent Application No. 2010249201, dated Jun. 30, 2011.
Notice of Acceptance for Australian Patent Application No. 2010249201, dated Sep. 9, 2011.
Official Action for Canadian Patent Application No. 2,415,915, dated Jan. 26, 2009.
Official Action for Canadian Patent Application No. 2,415,915, dated Apr. 26, 2011.
Notice of Allowance for Canadian Patent Application No. 2,415,95, mailed Mar. 7, 2012.
Official Action for European Patent Application No. 01964588.6, dated Mar. 17, 2005.
Official Action for European Patent Application No. 01964588.6, dated May 8, 2006.
Official Action for European Patent Application No. 01964588.6, dated Oct. 8, 2007.
Examination Report for European Patent Application No. 01964588.6, dated Nov. 10, 2008.
Communication about intention to grant a European patent for European Patent Application No. 01964588.6, dated Nov. 18, 2009.
Official Action (including translation) for Japanese Patent Application No. 2002-518640, mailed Oct. 25, 2010.
Notice of Allowance for Japanese Patent Application No. 2002-518640, dated Feb. 21, 2011.
Preliminary Rejection (including translation) for Korean Patent Application No. 10-2003-7001946, issued Apr. 12, 2007.
Official Action (including translation) for Korean Patent Application No. 10-2003-7001946, mailed Aug. 31, 2010.
Notice of Allowance (including translation) for Korean Patent Application No. 10-2003-7001946, mailed Feb. 25, 2011.
Translation of Preliminary Rejection for Korean Patent Application No. 10-2006-7025782, issued Feb. 8, 2007.
Official Action (including translation) for Korean Patent Application No. 10-2006-7025782, mailed Aug. 31, 2010.
Official Action (including translation) for Korean Patent Application No. 10-2006-7025782, mailed Sep. 30, 2011.
Official Action (Restriction Requirement) for U.S. Appl. No. 09/925,509, mailed Jul. 27, 2005.
Official Action for U.S. Appl. No. 09/925,509, mailed Oct. 17, 2005.
Official Action (Restriction Requirement) for U.S. Appl. No. 11/404,823, mailed Jul. 1, 2008.
Official Action for U.S. Appl. No. 11/404,823, mailed Aug. 20, 2008.
Official Action for U.S. Appl. No. 11/404,823, mailed Jun. 25, 2009.
Official Action for U.S. Appl. No. 11/404,823, mailed Dec. 31, 2009.
Notice of Allowability for U.S. Appl. No. 11/404,823, mailed Apr. 6, 2010.
Supplemental Notice of Allowability for U.S. Appl. No. 11/404,823, mailed May 27, 2010.
Official Action for U.S. Appl. No. 12/756,841, mailed Dec. 7, 2011.
Notice of Allowance for U.S. Appl. No. 12/756,841, mailed Mar. 27, 2012.
Official Action (including translation) for Korean Patent Application No. 10-2006-7025782, mailed May 24, 2012.

* cited by examiner

SYSTEMS AND METHODS FOR CHARACTERIZING TRANSMISSION LINES USING BROADBAND SIGNALS IN A MULTI-CARRIER DSL ENVIRONMENT

RELATED APPLICATION DATA

This application is a continuation of U.S. application Ser. No. 12/756,841 filed Apr. 8, 2010, now U.S. Pat. No. 8,208,519, which is a continuation of U.S. patent application Ser. No. 11/404,823 filed Apr. 17, 2006, now U.S. Pat. No. 7,773,666 which is a continuation of U.S. application Ser. No. 09/925,509 filed Aug. 10, 2001, which claims the benefit of and priority to U.S. Provisional Application Ser. No. 60/224,308 filed Aug. 10, 2000 entitled "Characterization of Transmission Lines Using Broadband Signals in a Multi-Carrier DSL System" and is related to U.S. patent application Ser. No. 09/755,172, filed Jan. 8, 2001 entitled "Systems and Methods for Loop Length and Bridged Tap Length Determination of a Transmission Line" and U.S. patent application Ser. No. 09/755,173, filed Jan. 8, 2001, entitled "Systems and Methods for Establishing a Diagnostic Transmission Mode and Communicating over the Same," all of which are incorporated herein by reference in their entirety.

BACKGROUND OF THE INVENTION

1. Field of the Invention

In general, the systems and methods of this invention relate to the determination of transmission line characteristics. In particular, this invention relates to systems and methods for determining the characteristics of a transmission line using broadband signals.

2. Description of Related Art

Rapid developments in the computer industry and the availability of affordable hardware created the Internet, i.e., a distributed network, wherein a user having a communications link between themselves and a computer in a centralized location can access publicly available information. Users of the Internet are connected to the distributed network through a link that includes, for example, a telephone line from a customer premises (CPE) to a telephone company central office (CO). A user requesting a data transfer from an Internet server is faced with the limited bandwidth of the connection between their location and the central office. As more and more information is being created and stored in digital format, the demand for users to access large data files is increasingly making it crucial to find new and faster ways of transferring data. One way of achieving faster data transmission is to increase the bandwidth of the transmission line between the users and the CO by, for example, replacing the current metallic conductors with fiber or using better quality metallic conductors having increased bandwidth. However, such an approach is costly and requires a substantial investment by the telephone companies.

Recent developments in digital signal processing and telecommunications have resulted in the digital subscriber line (DSL) technology enabling a high speed data link over existing twisted pair telephone lines. Although a couple of different DSL systems have been proposed, multi-carrier systems have quickly gained popularity and are becoming standardized. Multi-carrier DSL systems operate on the principle of frequency division multiplexing, wherein separate frequency bands are used to transfer data from the CPE to the CO and vice versa. The portion of the bandwidth allocated for transmitting data from the user to the CO is called the upstream (US) channel, and the portion of bandwidth allocated for passing data from the CO to the user is called the downstream (DS) channel. Since in a typical Internet session the amount of data being transferred from the CO to the user is much larger than the amount of data transmitted from the user to the CO, the bandwidth allocated for the downstream channel is usually much larger than the bandwidth allocated for the upstream channel. Typical ratios of downstream to upstream channel bandwidth are 4:1 or 8:1.

The bandwidth allocated to the upstream and downstream channels is partitioned into a large number of sub-bands which are sufficiently narrow so as to allow the distortions introduced by the line to be described as an attenuation and a phase shift. These parameters can be measured in a training session prior to establishing the data link by sending and receiving a predefined signal on a sub-band. The amount of data that can be sent in a sub-band is limited by the signal to noise ratio (SNR) in that sub-band, which is the signal strength described by the line attenuation divided by the noise power. Each of the sub-bands in the multi-carrier DSL system is used to transmit data that is consistent with the SNR on that sub-band and maximum allowable bit error rate (BER). A multi-carrier DSL system operating within the principles described above is able to achieve data rates that are as high as, for example, ten million bits per second.

SUMMARY OF THE INVENTION

Although the multi-carrier DSL systems are promising because they offer a cost-effective way of opening current telephone lines to high-speed data transmission traffic, there are important problems in the installation and maintenance phases of DSL deployment that prevent rapid and widespread deployment. For example, existing telephone lines were initially installed for voice-only transmission. This voice-only transmission can be successfully transmitted using only a small bandwidth. Multi-carrier DSL systems require utilizing a bandwidth much larger than that required by the voice transmission. At high frequencies, line conditions that do not affect the voice transmission become important factors limiting the digital data transmission rate. For example, the line attenuation is related to the loop length. Also, the strength of the signal sent from either the CO or the user will decrease with distance. Additionally, small, open-circuited, twisted pairs, called bridged taps, connected in shunt with working twisted pairs, while not affecting voice transmission, cause periodic dips in the attenuation function of the line at certain sub-bands and hence degrade the performance of the DSL service. Additionally, telephone lines are usually bundled as 25 or 50 twisted pairs in a cable. The close proximity of the twisted pairs in the cable causes the signals generated by the various DSL services carried by a specific telephone line to be picked up by one or more of the remaining telephone lines in the bundle. These signals are perceived as additive noise components because they are unpredictable and meaningless for all but one of the telephone line carrying the actual service. The interference entering the telephone lines through some coupling path with other telephone lines is referred to as crosstalk.

There may be other sources of noise in a telephone line which are caused by the reception of electromagnetic (EM) waves transmitted by various sources such as AM radio stations, electrical devices such as hair dryers, dimmer switches, alarm systems, or the like. The most detrimental of these electromagnetic sources are generally the AM radio stations. Since no two telephone lines are the same, and the availability and the quality of a DSL link is directly proportional to the conditions of the line as described above, it is important to be able to qualify telephone lines for DSL service and maintain the communications link once the service is established. To decrease the costs associated with service qualification and maintenance, it may be desirable to qualify and maintain telephone lines remotely, without having to send a technician to the customer premises.

Establishing a communications link between a user and one or more servers connected to the backbone of the central office requires a DSL transceiver to handle the data transmission in accordance with the basic principles outlined above. Each of the transceivers at either side of the link, i.e., the CO and the CPE, are called modems. The CO and the CPE modems comprise some analog hardware to perform analog signal transmission and reception, and a digital section which comprise a digital signal processing (DSP) chip and, for example, an Applications Specific Integrated Circuit (ASIC) that handles signal processing operations. Because of the high data rate associated with DSL service, the DSP chip should be able to complete the necessary processing and manipulation of digital data quickly and efficiently. An exemplary embodiment of the present invention takes advantage of the vast computational capacity of DSL modems and the presence of the DSP chips at the two sides of the transmission line to characterize the transmission line. While the DSL modems can operate as a modem in their usual state, they are also capable of operating in a separate mode where they can be used as test and measurement devices.

An exemplary issue faced during the installation and maintenance of DSL service is the determination of the physical structure and the condition of the line so that a decision can be made regarding the suitability of the loop for DSL service, and which steps can be taken, if any, to improve the telephone line so that the service providers can offer better DSL service. For example, if a bridged tap causing a substantial data rate reduction is found, the telephone company may send a technician to remove the bridged tap. In general, the loop length, the detection of the bridged taps and the estimation of their lengths and locations, and the detection of interferers on the line is useful for characterizing the transmission line.

Additionally, after the installation of the DSL hardware, the link must be monitored in order to ensure continued service quality. This generally requires determining changes in the transmission environment which can again, for example, be accomplished by using the signal processing capabilities of the DSL modem.

In accordance with an exemplary embodiment of this invention, the CO and CPE modems are used as test points. The test process comprises collecting specific data sets during modem training, postprocessing the data to facilitate the use and interpretation thereof, and extracting results regarding the line condition. In modem training, the objective is to perform measurements and determine the parameters of the transmission line so as to allow restoration of the original signals transmitted by the CPE and the CO modems. These signals are generally distorted by the transmission line through attenuation and phase shift, and further degraded by noise. The CO and CPE modems go through a pre-defined and standardized set of states to learn the parameters of the entire communications system. They transmit and receive signals known to each modem. These signals help in characterizing the transmission line. For example, in accordance with an exemplary embodiment of this invention, data collection software and/or hardware, i.e. a module, is added to either or both of the CO and the CPE modems. This data collection module allows some of the data sets already used in the modem training to be collected with and saved for further analysis. The data collection module also allows additional and new data to be obtained.

Since the CO and the CPE modems operate based on frequency division multiplexing, the data collected at the CPE and CO modems are different in the sense that the CPE modem transmits in the upstream channel and receives in the downstream channel, and the CO modem transmits in the downstream channel and receives in the upstream channel. Therefore, the bandwidth of the data collected at the CPE modem is limited to the bandwidth of the downstream channel and similarly, the bandwidth of the data collected at the CO modem is limited to the bandwidth of the upstream channel. Therefore, as a result of the modem training, the upstream data can be collected and saved in the CO modem. Likewise, the downstream data can be collected and saved at the CPE modem. This type of test process makes use of the standard modem training procedures and therefor relies on the existence of both the CO and the CPE modem. This will be referred to as a double-ended test.

In a double-ended test, the downstream data collected at the CPE modem can be transferred to the CO modem to, for example, be further analyzed by service technicians and/or additional hardware and/or software. This requires the ability to establish a special diagnostic link between the CO and the CPE modems for transmitting the diagnostic data, even if the standard DSL link fails. This can be accomplished, for example, by the method described in co-pending U.S. application Ser. No. 09/755,173. In the case where a diagnostic link cannot be established, only local data, i.e., the upstream data at the CO modem, and the downstream data at the CPE modem, will be available for analysis.

One or more entities, such as a telephone company, may also want to perform a single-ended test from either the CO or the CPE modem to, for example, pre-qualify customer lines for DSL service. Additionally, for example, a computer manufacturer who installs DSL modems into its computers may want to perform a single-ended test so that a customer can determine what type of DSL service to order. In these cases, the signal processing capabilities of the DSL modem can be utilized in a different fashion. In a double-ended test, one of the modems acts as a signal generator and the other works as a signal receiver. In a single-ended test, the same DSL modem acts as both the signal generator and the signal receiver for characterizing the communications link.

In accordance with an exemplary embodiment of the invention, an aspect of the invention relates to the postprocessing and interpretation of data collected on a communications link.

An additional aspect of the invention relates to collecting data from one or more of a CO and a CPE modem.

Additionally, aspects of the invention also relate to manipulating data at one or more ends of a communication system to ease subsequent use and interpretation of the data.

Additionally, aspects of the invention also relate to one or more of calibrating, filter compensating, estimating of remote SNR tables, and data rate converting the data obtained from one or more of the CO and CPE modems.

Additional aspects of the invention also relate to outputting easy to interpret results about the line conditions.

Additional aspects of the invention also relate to outputting easy to interpret results about the communication link between the CPE and the CO.

These and other features and advantages of this invention are described in or apparent from the following detailed description of the embodiment.

BRIEF DESCRIPTION OF THE DRAWINGS

The embodiments of the invention will be described in detail, with reference to the following figures wherein:

FIG. 16 illustrates an overview of the exemplary function of determining communications link characteristics according to this invention.

DETAILED DESCRIPTION OF THE INVENTION

The exemplary embodiments of this invention will be described in relation to the application of the invention to an ADSL transceiver environment. However, it should be appreciated that in general the systems and methods of this invention will work equally well for any multicarrier communication system including, but not limited to DSL, VDSL, SDSL, HDSL, HDSL2, or any other discrete multi-tone or discrete wavelet multi-tone DSL system.

Figure 1:
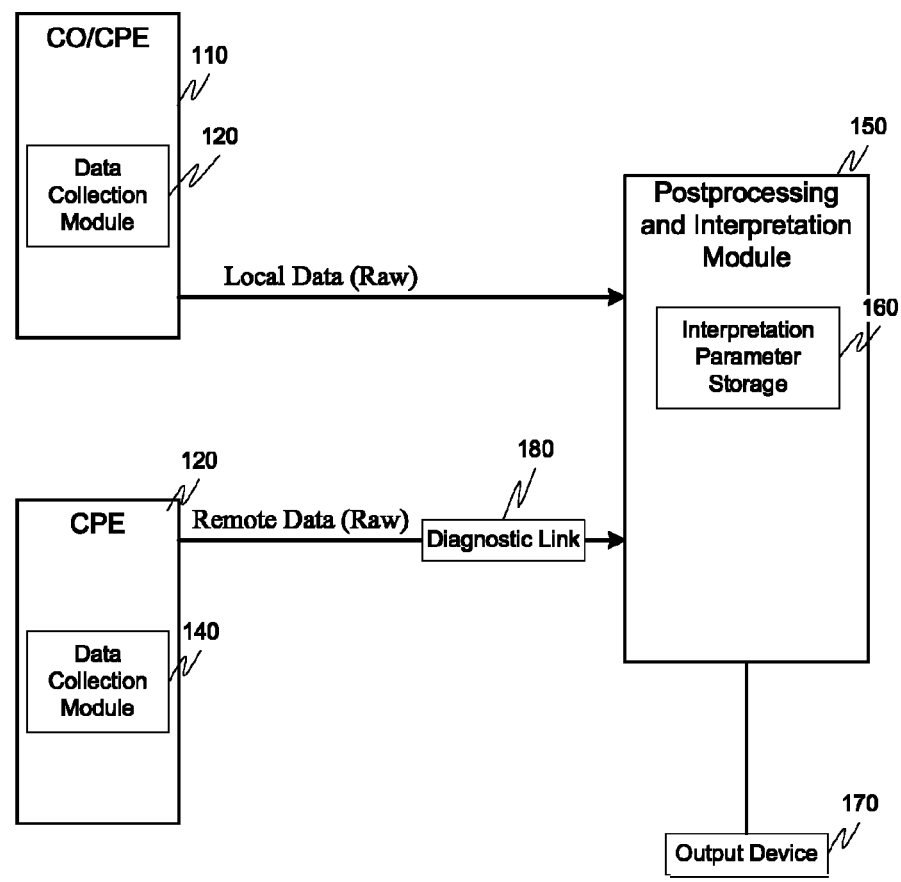
FIG. 1 illustrates an exemplary line characterization system according to this invention.

FIG. 1 illustrates an exemplary line characterization system 100. The line characterization system 100 comprises one or more CO modems 110, one or more CPE modems 130 and a postprocessing and interpretation module 150. Additionally, the CO modem 110 comprises a data collection module 120. Likewise, the CPE modem 130 comprises a data collection module 140. The processing and interpretation module 150 comprises an interpretation parameter storage 160 and is connected to one or more output devices 170.

For ease of illustration, the standard components associated with the CO modem 110 and a CPE modem 130 have been omitted although are readily identifiable by one of ordinary skill in the art. Furthermore, the postprocessing interpretation module 150 has been simplified but can include, for example, a controller, an I/O interface, a memory, and/or may be implemented on a digital signal processor, an ASIC, or any hardware and/or software combination that is capable of performing the functions described herein. The postprocessing interpretation module 150 is also connected to one or more output devices 170 such as a printer, monitor, line characterization display system, PDA, graphical user interface, network monitoring system, DSL analysis system, or the like.

While the exemplary embodiment illustrated in the FIG. 1 shows the line characterization system 100 and various components separated, it is to be appreciated that the various components of the line characterization system can be combined or located at distance portions of a distributed network, such as a local area of network, a wide area network, an intranet and/or the Internet, or within a dedicated line characterization system. Thus, it should be appreciated, that the components of the line characterization system 100 can be combined into one device or collocated on a particular node of a distributed network or combined into one or more of a CO or CPE modem. Thus, it will be appreciated from the following description, and for reasons of computational efficiency, that the components of the line characterization system 100 can be arranged any location, such as in a general purpose computer or within a distributed network or dedicated line characterization system without affecting the operation of the system.

As discussed above, the data collection modules 120 and 140, which can be a combination of hardware and/or software, at least allow for the data sets used in modem training to be collected and saved. Furthermore, the data collection modules 120 and 140 allow for the collection of new data or data sets that can be obtained either during training or in showtime. Thus, one or more data sets are collected from either the data collection module 120 and/or the data collection module 140 and forwarded to the postprocessing interpretation module 150 for analysis.

For example, as discussed above, in the event it is difficult to establish a communication link between a modem and the postprocessing and interpretation module 150, a diagnostic link can be established such as that described in co-pending U.S. application Ser. No. 09/755,173. However, in general, any protocol or method that is capable of forwarding the data from one or more of the CEO and CPE modems can work equally well with the systems and methods of this invention.

After data collection, the postprocessing and interpretation module 150 processes the data to, for example, allow easier interpretation of the line characteristics. In particular, the postprocessing process includes calibration, filter compensation, determination of the SNR medley from the bits and gains tables and rate conversion. The interpretation process includes, with the cooperation of the interpretation parameter storage 160 that stores one or more parameters, loop characterization, interferer detection, a data reduction estimation and a data rate estimation.

In general, the postprocessing involves various tasks such as converting the raw data from one format to another, scaling the data and compensating for the analog and digital filters in the transmission path.

In general, during the interpretation process, the exemplary loop length estimation procedure estimates the loop length and attempts to determine the presence of one or more bridged taps on the transmission line. If a bridged tap is detected, the length of the bridged tap is also estimated. The estimation is performed by comparing a model of the transfer function of the line, which is parameterized in terms of the loop length and the bridged tap lengths and locations, to the actual measured transfer function of the line. Three different algorithms are used to estimate the physical structure of the loop depending on which data set is being used, i.e., upstream, downstream, or single-ended time domain reflectometry.

The interferer detection process identifies crosstalk and electromagnetic disturbers on the line by analyzing the measured power spectrum of the noise. The data rate reduction estimation estimates the data rate reduction caused by the presence of the disturbers on the transmission line. Similarly, the data rate estimation estimates the maximum data rate the transmission line can support through the use of a single-ended test. The test combines the results of the single-ended time domain reflectometry test and the measurement of the power spectrum of the noise on the line to estimate a rough SNR profile for both the upstream and the downstream channels as well as estimates the data rate based on these SNR tables.

FIG. 16 illustrates an overview of the method for performing communications link characterization. Specifically, control begins in step S10 and continues to step S20. In step S20, raw data is obtained from one or more of a CO modem and a CPE modem. Next, in step S30, postprocessing is performed on a portion of the raw data. Then, in step S40, interpretation is performed on one or more of a portion of the raw data and a portion of the postprocessed data. Control then continues to step S50.

In step S50, the communications link, i.e., line, condition information is output in, for example, a visually displayable format. Control then continues to step S60 where the control sequence ends.

Figure 2:
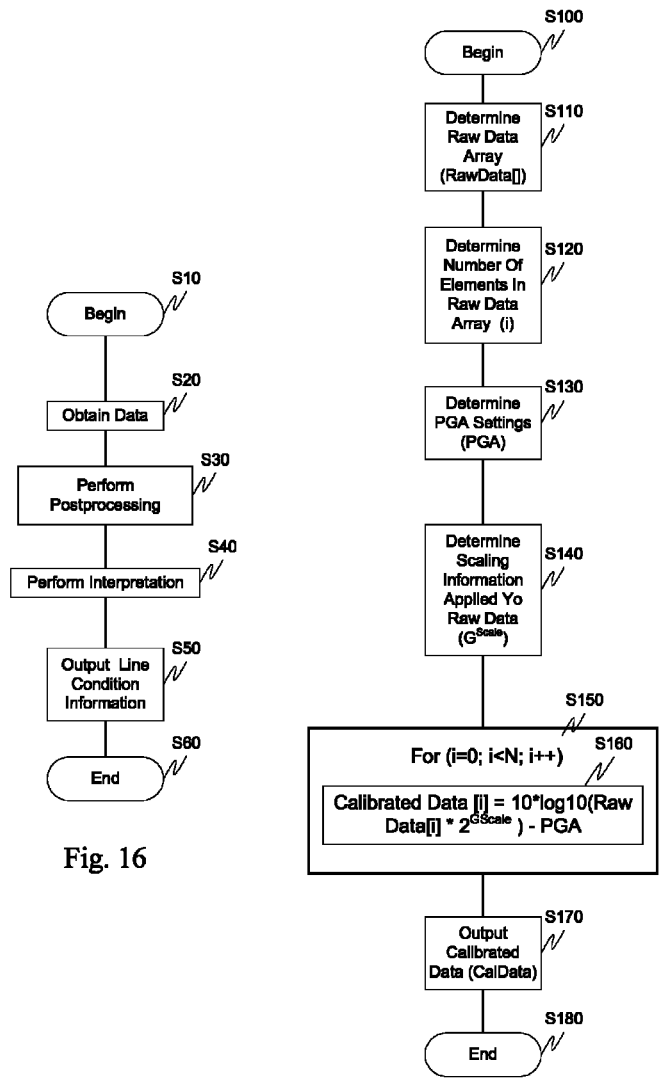
FIG. 2 illustrates an exemplary method of determining calibrated data according to this invention.

FIG. 2 outlines an exemplary method for performing a calibration that modifies the collected data so that the data appears as if it had been measured, for example, with standard test equipment. In particular, the calibration routine takes the received data, which can come in the form of a raw data, the programmable gain amplifier (PGA) settings used to collect the data, and the gain scaling, if any, and outputs the calibrated data. However, this calibration function and the resulting calibrated data may vary depending on the actual implementation and the raw data being analyzed.

In particular, control begins in step S100 continues to step S110. In step S110, a raw data array is received. Next, in step S120, the number of elements in the raw data array is determined. Then, in step S130, the PGA settings that were present during the data collection process are determined. Control then continues to step S140.

In step S140, the scaling information that was applied to the received raw data is determined. Next, in step S150, and for a predetermined number of iterations, step S160 is performed. In particular, in step S160, an output array containing the calibrated data is determined. Control then continues to step S170.

In step S170, the calibrated data array is output. Controlling continues to step S180 where the control sequence ends.

The filter compensation routine removes the effects of the analog front-end (AFE) filters from the received data. In particular, the filter compensation routine modifies the calibrated data based on the device specific frequency domain response of the AFE filters, and outputs the filter compensated data.

Figure 3:
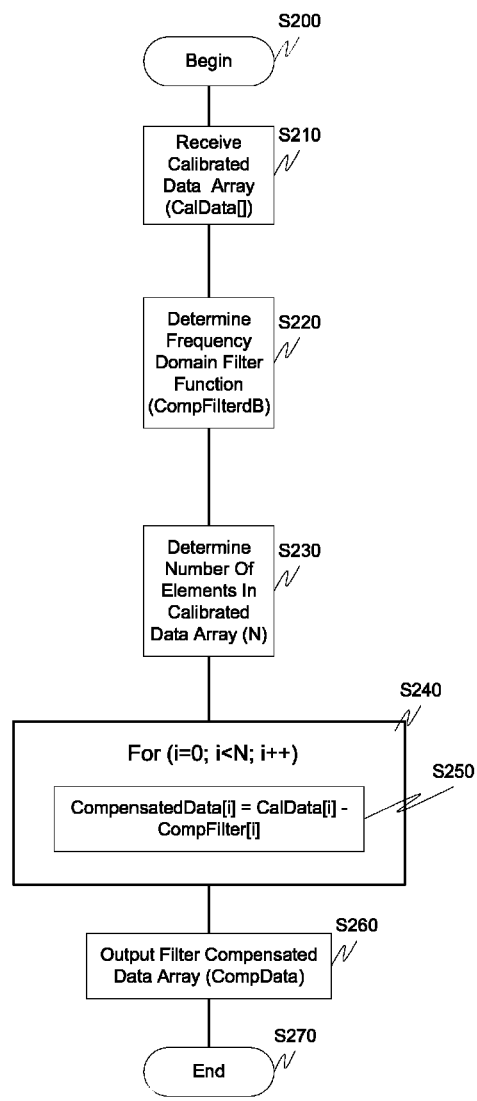
FIG. 3 illustrates an exemplary method of determining filter compensated data according to this invention.

FIG. 3 illustrates an exemplary method of performing the filter compensation. In particular, control begins in step S200 and continues to step S210. In step S210, the calibrated data array is received. Next, in step S220, the device specific frequency domain filter function, in dB, is received. Then, in step S230, the number of elements in the calibrated data array is determined. Control then continues in step S240.

In step S240, for a predetermined number of iterations, step S250 is performed. In particular, in step S250, the filter compensated data, which is an array containing the filter compensated and calibrated data is determined. Next, in step S260, the filter compensated data array is output. Control then continues in step S270 where the control sequence ends.

In, for example, service monitoring, the CPE and the CO modems collect the reverb signal received in a sync frame. Since time domain equalization and frequency domain equalization are normally in operation during showtime, the received reverb signal is affected by the time domain equalization and frequency domain equalization filters. Through the use of frequency domain deconvolution, it is possible for the postprocessing and interpretation module 150 to remove the effects of the time domain equalization and the frequency domain equalization.

Figure 4:
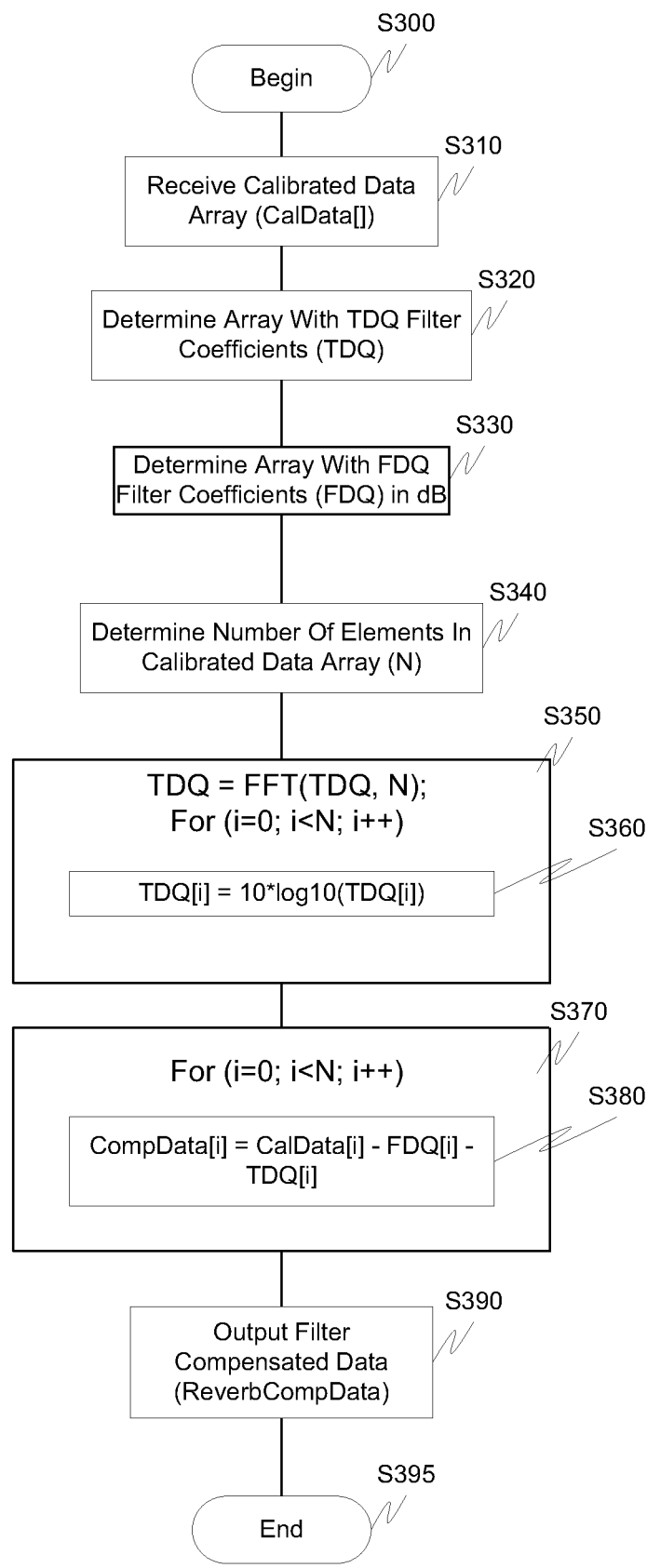
FIG. 4 illustrates an exemplary method of reducing the effects of time domain and frequency domain filters according to this invention.

In particular, FIG. 4 outlines an exemplary method of reducing the effects of the time domain and frequency domain equalization filters. Control begins in step S300 and continues in step S310. In step S310, the calibrated data array in dB is received. This calibrated data can be either before or after the correcting for the time and frequency domain equalization. Next, in step S320, an array with the time domain equalization filter coefficients are determined. For example, the time domain equalizer coefficients can be stored in the CO/CPE modem after training so the system need only access the stored coefficients. Then, in step S330, an array with the frequency domain equalizer filter coefficients, in dB, is determined. For example, the frequency domain equalizer coefficients can be stored in the CO/CPE modem after training so the system need only access the stored coefficients. Control then continues to step S340.

In step S340, the number of elements in the calibrated data array is determined. Next, in step S350, for a predetermined number of iterations, the Fast Fourier Transformed of the time domain equalization coefficients is determined. Control then continues to step S370.

In step S370, and for a predetermined number of iterations, a deconvolution in the log frequency domain is performed in step S380 to determine the compensated data value. In step S390, the compensated data, which reduces or removes the effects of the time domain equalization and the frequency domain equalization, is output. Control then continues to step S395 where the control sequence ends.

In two-ended provisioning, if a CO or CPE modem is not capable of establishing a diagnostic link, only the local upstream or downstream data is available. However, a representation of the SNR table at the far end modem can be obtained through a standard link. According to the G.dmt and G.Lite specifications, each of which are incorporated herein by reference of their entirety, each modem sends a bits and gains table to the corresponding upstream or downstream modem. This table indicates the number of bits assigned to each tone and the corresponding fine gain. Since the bit allocation table is directly related to the SNR, the postprocessing and interpretation module 150 is able to perform a reverse transformation from the bits and gains table to the SNR table.

Figure 5:
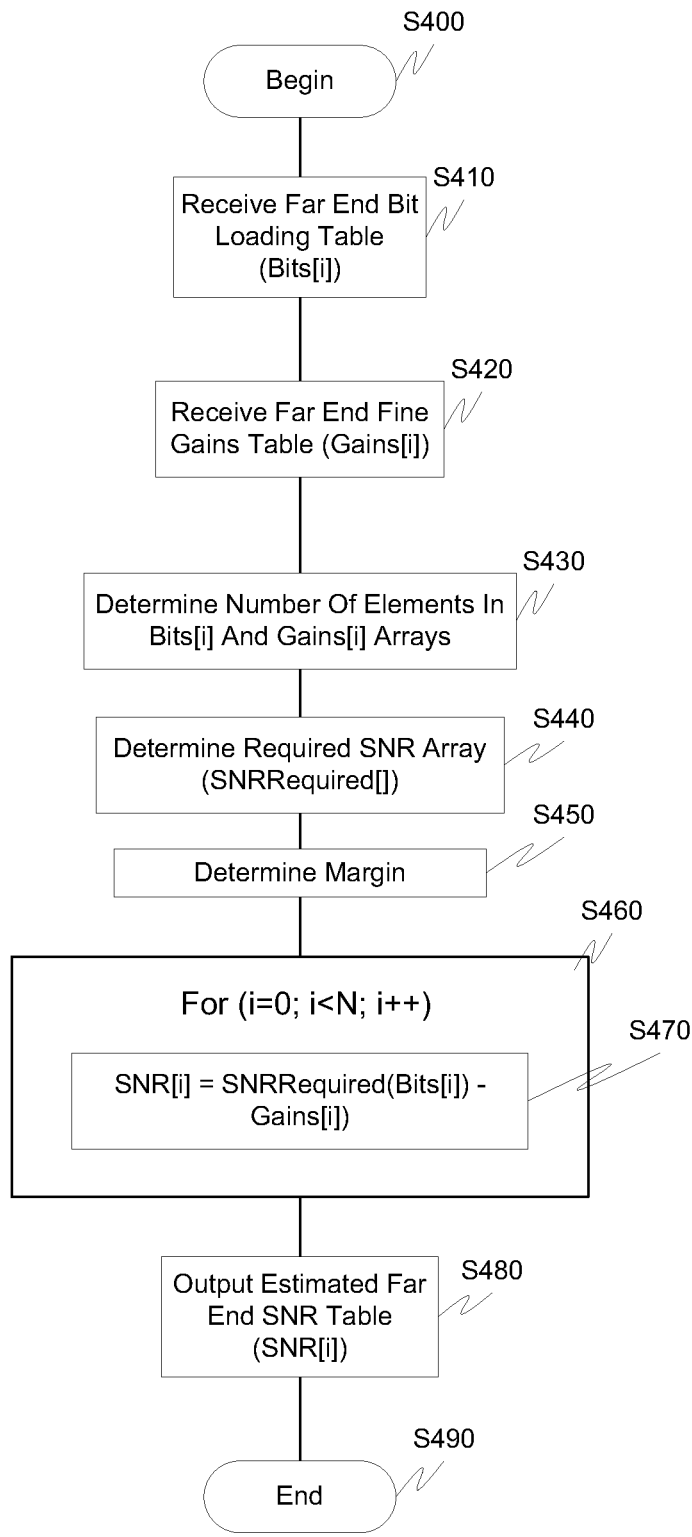
FIG. 5 illustrates an exemplary method of determining a far-end SNR table according to this invention.

In particular, FIG. 5 outlines an exemplary method of determining the SNR medley from the bits and gains table. In particular, control begins in step S400 and continues in step 410. In step S410, the far-end bit loading table is received. In step S420, the far-end fine gains table is received. Then, in step S430, the number of elements in the bits and gains arrays is determined. Control then continues to step S440.

In step S440, the required SNR array is determined. For example, the required SNR array can be a predetermined pre-set array for the specific DSL application. This array can be obtained from, for example, the G.lite, G.992.1, and G.992.2 specifications, each of which are incorporated herein by reference in their entirety. The SNR array can also be stored in the CO/CPE modem software to be used in the bitloading phase of the modem initialization. Next, in step S450, the margin is determined. The margin is a parameter that determines by how much the SNR will be reduced in determining the bit table. For example, a margin of 6 dB means that when assigning the bit table, the SNR at each bit will be reduced by 6 dB. Therefore, the margin provides the system with a SNR cushion against sudden noise bursts. Next, in step s460, for a predetermined number of iterations, the SNR table is estimated in step S470. Control then continues to step S480.

In step S480, the estimated far-end SNR table is output. Control then continues in step S490 where the control sequence ends.

In addition to the above, the postprocessing interpretation module 150 is also capable of converting the data rate of the received data array. In particular, and in accordance with an exemplary embodiment, the data array is converted, based on units of 32 Kbps, to the actual data rate in Kbps.

Figure 6:
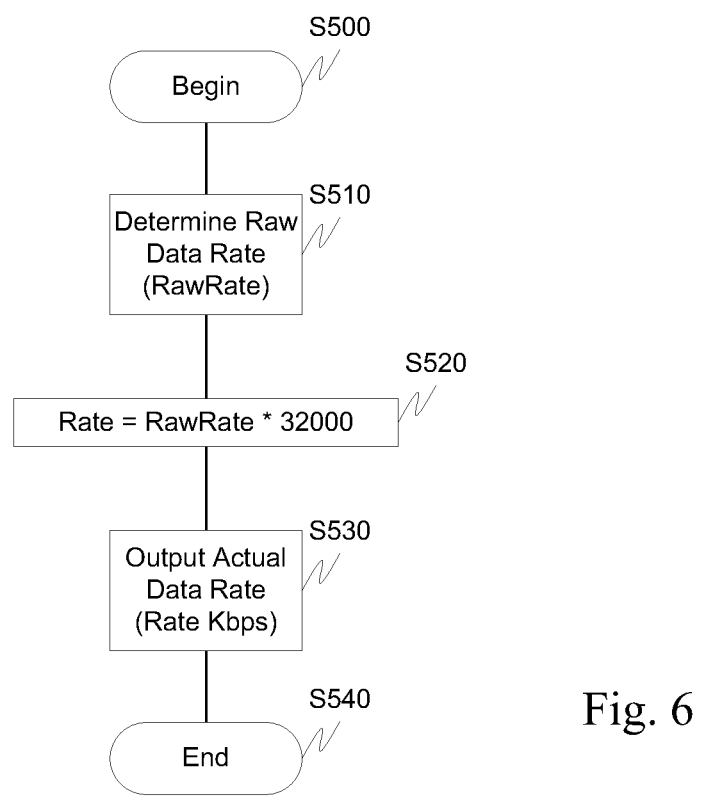
FIG. 6 illustrates an exemplary method of determining the actual data rate according to this invention.

FIG. 6 outlines an exemplary method of converting the data rate. In particular, control begins in step S500 and continues in step S510. In step S510, the raw data rate is determined. Next, in step S520, the raw data rate is converted to the actual data rate in Kbps. Then, in step S530, the actual data rate is output. Control then continues the step S540 where the control sequence ends.

The interpretation portion of the postprocessing and interpretation module 150 extracts comprehensible results from the postprocessed data. In particular, as discussed above, during interpretation, the postprocessing and interpretation module 150 is at least capable of performing loop characterization, crosstalk and disturber estimation, AM radio and electromagnetic interference detection, rate degradation estimates and data rate estimates.

In particular, an exemplary method of loop characterization that works with the systems and methods of this invention employs a model based approach to estimate the length of the loop and the lengths of up to two bridged taps. Specifically, as illustrated in co-pending application Ser. No. 09/755,172, a comparison is made between the measured channel impulse response and the channel impulse response of a loop model consisting of a single-gauge wire and containing up to two bridged taps. The loop length and the bridged tap lengths are the parameters of the theoretical channel impulse response. The algorithm changes the parameters of the theoretical model and evaluates the difference between the measured channel impulse response and the theoretical channel impulse response. The loop length and/or bridged tap lengths that minimize the error functions are then declared as the estimated values.

While the above described method takes advantage of a double-ended diagnostic mode whereby the CO and CP modems are available, if the CPE modem is not yet installed or is not operational, the postprocessing and interpretation module can perform a time domain reflectometry (TDR) technique that can be used to estimate the physical structure of the line.

Specifically, the data required by the time domain algorithm is obtained by sending a pre-defined signal over the channel and evaluating the echo waveform. The echo obtained in this way is analyzed to detect the impedance discontinuity caused by any bridged taps, an open-end of the loop, load coils, or the like. An echo cancellor (not shown) can be running during the time domain reflectometry measurements in order to cancel the near-end echo caused by the analog front-end (AFE) circuitry of the line card.

If $x_k(n)$, $n=1, \ldots, n$, where N is the number of signal samples within a frame, is the sampled version of the received signal at the $k^{th}$ frame at the output of the echo cancellor, the TDR waveform becomes:

$$TDR(n) = \frac{1}{K} \sum_{k=1}^{K} x_k(n)$$

Note that the TDR waveform is obtained by time-domain averaging. Therefore, the FFT in the receive path will be turned off during the averaging process.

In theory, any impedance discontinuity in the loop causes a reflection which is observed as a pulse whose location and height can be used to estimate the distance of the impedance discontinuity as well as the type, i.e., whether the impedance discontinuity is caused by a bridged tap or open-end of the loop. If multiple impedance discontinuities are present in the loop, analyzing the time domain waveform of the echo signal becomes very complicated. For this reason, a model based approach can be used for the TDR estimations.

Figure 7:
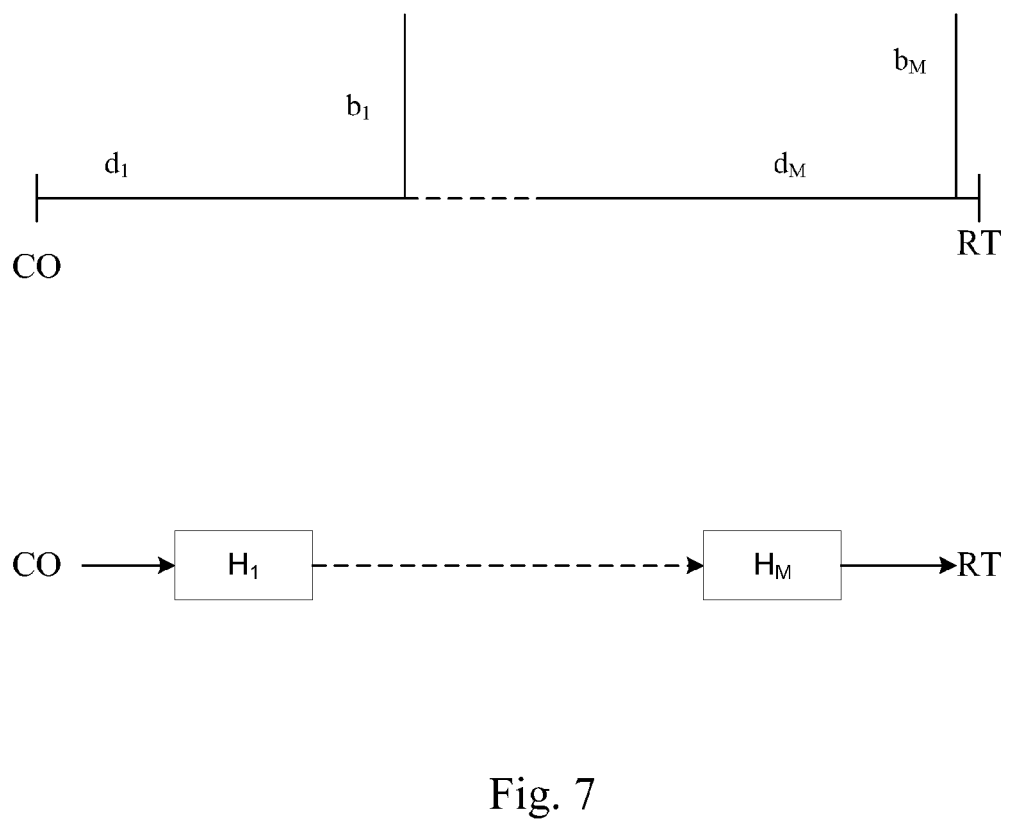
FIG. 7 illustrates an exemplary loop length model according to this invention.

The exemplary method generally compares the observed echo with that of a model where the channel is assumed to consist of three sections separated by two bridged taps as shown in FIG. 7. An objective of the TDR analysis is to estimate $d_i$, $i=1, 2, 3$ and $b_j$, $j=1, 2$ which provide information about the location and the lengths of the bridged taps as well as the length of the entire loop.

In the measurement phase, all the phones in the customer premises should be on-hook. This is necessary since the loop model assumes that the end of the loop is null terminated, i.e., open. This requires detection of on/off-hook conditions prior to the TDR measurements.

Next the TDR measurement is conducted by averaging the echo signal over K frames and recording the result. This procedure results in a time domain echo waveform which will be compared with the echo response of a known loop.

The theoretical model for the echo channel transfer function in the upstream case can be described in two steps. The first step consists of writing the equations for the current and the voltage at the source (CO Transmit), $I_s$, $V_s$, in terms of the current and the voltage at the load (CO Receive), $I_L$, $V_L$, through the application of ABCD matrices. Thus, the echo response of a loop given $d_i$ and $b_j$ is given by:

$$\begin{bmatrix} V_S \\ I_S \end{bmatrix} = F^s \times A^1 \times B^1 \times A^2 \times B^2 \times A^3 \times F^L \times \begin{bmatrix} V_L \\ 0 \end{bmatrix}$$

where $A^i$, $B^j$, $F^S$ and $F^L$ are 2×2 matrices whose elements are in fact arrays of N/2 elements where N is the number of samples in the TDR waveform buffer or frame as before. Here, $A^i$ is a matrix representing the frequency domain response of the $i^{th}$ section of the loop, $B^j$ is the matrix representing the response of $j^{th}$ bridged tap, and $F^S$ and $F^L$ are the matrices representing the AFE circuitry for TX (source) and RX (load) paths. From the above transfer function, the echo path can be derived and is given by:

$$H_{echo} = \frac{V_L}{V_S}$$

Entries of the above matrices are as follows:

$$A_{11}^i = A_{22}^i = \cos h(\gamma d_i)$$

$$A_{12}^i = Z_0 \sin h(\gamma d_i), A_{21}^i = A_{12}^i Z_0^{-2}$$

Entries of matrix $B^j$:

$$B^j_{11}=B^j_{22}=1$$

$$B^j_{12}=0, B^j_{21}=Z_j^{-1}$$

Where $Z_j^{-1}$ is a quantity related to the impedance of the $j^{th}$ bridged tap and finally:

$$F^S_{11}=F^S_{22}=1, F^S_{12}=0, F^S_{21}=Z_S$$

$$F^L_{11}=F^L_{22}=1, F^L_{12}=0, F^L_{21}=Z_L^{-1}$$

From these equations the required memory size can be determined. As an example, each of the entries of the matrices can be arrays of 128 complex elements. Since it can be complex to determine the cos h(γd) and the sin h(γd) values, these quantities can be predetermined in regular intervals, such as, 500 ft intervals, from 5 kft to 15 kft. These exemplary predetermined intervals would require 42×256 locations for storing the cos h(.) and the sin h(.) values, and 256 locations for storing $Z_0^{-2}$. Assuming the bridge tap lengths can be distinguished in 250 ft increments, 6×256 locations would need to be allocated for $Z_j^{-1}$. Additionally, 2×256 locations for storing the $Z_S$ and the $Z_L^{-1}$ values would be needed. This totals 52×256 locations. Also, 8×256 locations would be needed for storing the intermediate results of the multiplications.

Given the theoretical echo transfer function of the system, the loop length and bridged tap lengths and locations are estimated by minimizing the following with respect to $d_1$, $d_2$, $d_3$ and $b_1$, $b_2$:

$$\min_{d_i, b_j} |TDR - H_{echo}(d_i, b_j)|^2$$

Thus, a search must be performed over the $d_i$ and $b_j$ parameters. From the location of the first reflected pulse $d_1$ and $b_1$, if the reflection was caused by a bridge tap, the location can be estimated. Therefore, $d_1$ and $b_1$ can be eliminated from the search. The first three matrices in the expression for echo response, $F^S \times A^1 \times B^1$ can be lumped together and need not be considered. For each set of search parameters, $d_2$, $b_2$, $d_3$, the echo response is constructed. Then, the difference between the actual and theoretical echo responses is determined. This procedure is repeated as many times as needed by the search algorithm. Since the search algorithm generally needs a variable number of iterations to arrive at the optimal $d_2$, $d_3$, $b_2$ values, this number is difficult to predict.

Figure 8:
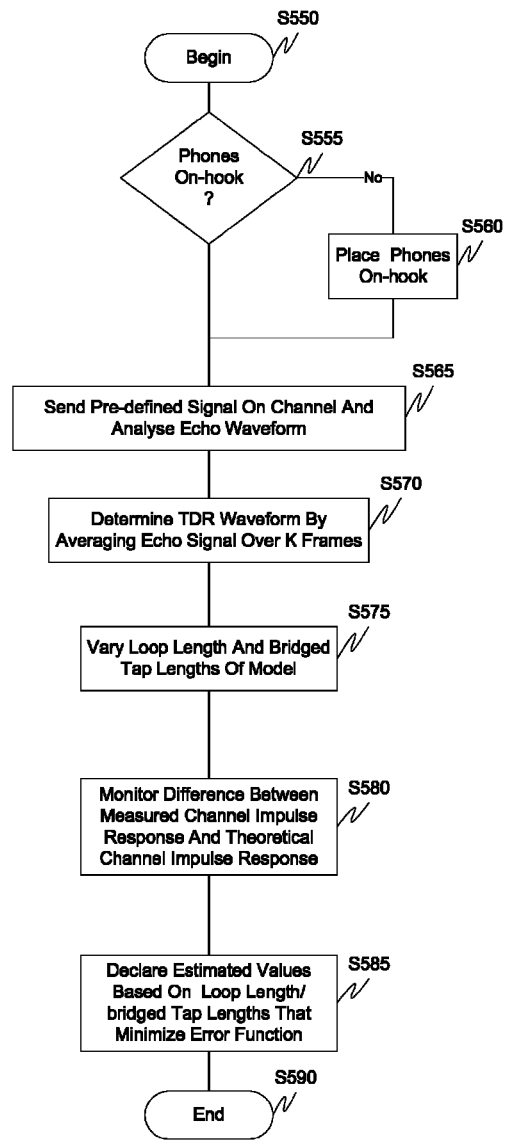
FIG. 8 illustrates an exemplary method of determining loop lengths and bridged tap lengths according to this invention.

FIG. 8 illustrates an exemplary method of characterizing the loop using time domain reflectometry. Specifically, control begins in step S550 and continues to step S555. In step S555, a determination is made whether the phones are on-hook. If the phones are on-hook, control jumps to step S565. Otherwise control continues to step S560. In step S560, the phones are placed on-hook. Control then continues to step S565.

In step S565, a predefined signal is sent over the channel and the echo waveform analyzed. Next, in step S570, the TDR waveform is determined by averaging the echo signal over K frames. Then, in step S575, the loop length and the bridged tap lengths of the model are varied. Control then continues to step S580.

In step S580, the difference between the measured channel impulse response and the theoretical channel impulse response is monitored. Next, in step S585, the estimated values are declared based on the loop length/bridged tap length that minimizes the error function. Control then continues to step S590 where the control sequence ends.

Aside from estimating the elements such as the loop length and the bridged tap lengths that form the physical structure of a loop, the interpretation procedure is also capable of identifying various crosstalk and disturbance sources on the channel. Twisted cable pairs are typically bundled as 25 or 50 pair units. Different DSL services, such as HDSL, T1 or ISDN, carried by one or more of the twisted pairs are usually picked up by the remaining twisted pairs in the bundle and observed as noise sources. The interference entering a twisted pair through some coupling path with the other twisted pairs are called crosstalk.

There are other sources of disturbance on the line that are caused by electromagnetic coupling. A good example is AM radio stations. Faulty in-home wiring usually results in the observation of AM signals in the DSL frequency band. An objective of the crosstalk/disturber estimation algorithms is to identify the crosstalk sources and provide quantitative information about the sources such as power level and frequency of the disturber. The identification of a crosstalk/disturber on the line is followed by a rate degradation estimation which is a prediction of the data rate loss caused by the presence of the identified disturber.

From an algorithmic point of view, there are two different algorithms that identify the crosstalk and ElectroMagnetic Interference (EMI). After a discussion of the data collection process, these two algorithms will be described in detail.

The interferer detection procedure uses the power spectrum of the idle channel noise (ICN) for the estimation of the crosstalk/disturbers on the line. During the ICN measurement, the channel is monitored to ensure that there are no meaningful signals, such as an activation request tone, on the line. If a signal present on the receiver is denoted as x(n), where n=1, ..., N is the sample index within a frame, and N is the number of samples contained in a frame, the power spectrum, $S_{xx}(f)$, is estimated according to:

$$S_{xx}(f) = \frac{1}{K}\sum_{k=1}^{K}|FFT_N(x_k(n))|^2$$

where $x_k(n)$ is the sampled signal collected during the $k^{th}$ frame and K is the number of frames over which the above averaging is performed. In other words, the N-point signal sequence $x_k(n)$ is sampled at the $k^{th}$ frame, the N-point FFT taken and the average of the square of the magnitudes of the FFT coefficients for K consecutive frames determined. This procedure provides the periodogram estimate of the power spectrum. As was the case with the reverb signal measurements, the power spectrum is available only at a discrete set of frequencies, fi=iΔf, i=$i_f$, ..., $i_l$, where $i_f$ and $i_l$ denote the first and the last tones where the power spectrum is sampled. The accumulation process continues until the desired precision in noise measurement process is obtained. For example, K=512 or K=1024 accumulations should provide excellent results.

The crosstalk type and power are estimated by comparing the measured noise power spectrum to known crosstalk spectral masks such as DSL Next, HDSL Next, T1 Next, or the like. The algorithmic steps are to minimize with respect to i, where i denotes the ith known disturber, g, which is the power of the disturber, and σ, which represents the power of the white noise, the square of the difference between the observed and the known interferer power spectral masks. The disturber which minimizes the mean square error (MSE) in accordance with:

$$MSE_i(g, \sigma) = \sum_{n=6}^{256} |PSD_{ICN}(n) - (g^2 PSD_i(n) + \sigma^2)|^2$$

is determined.

In the above algorithm, i, g and σ, which are associated with the disturber type, power and white noise level, respectively, are varied and the set of variables which minimizes the MSE over all candidate crosstalk types chosen. For example i=1 may denote a DSL Next disturber and g may denote its power. As an example, the memory requirements for this algorithm can be 256 locations to store the ICN power spectra and 256 locations to store the power spectra of each known disturber. If there are P different types of known disturbers the storage requirement is P×256. However, it should be noted that the storage requirements can be reduced by determining the PSD of the given crosstalk on the fly rather than using the 256 locations to store the entire spectrum. Therefore, data memory can be traded off with program memory and approximately 350 additional locations for storing intermediate variables can be used during the exemplary execution of the MSE search algorithm.

As for the search algorithm which will be used to determine the parameters i, g and σ which minimize the MSE, it is straightforward to detect the background white noise level so this noise level can be dropped from the search algorithm. What remains is minimizing the MSE with respect to g for each i which can be accomplished by picking Q possible values for g and finding, over these Q predetermined values, the one minimizing the MSE. Typical exemplary values for P and Q are P=5, i.e., five known disturber PSD's, and Q=50.

Figure 9:
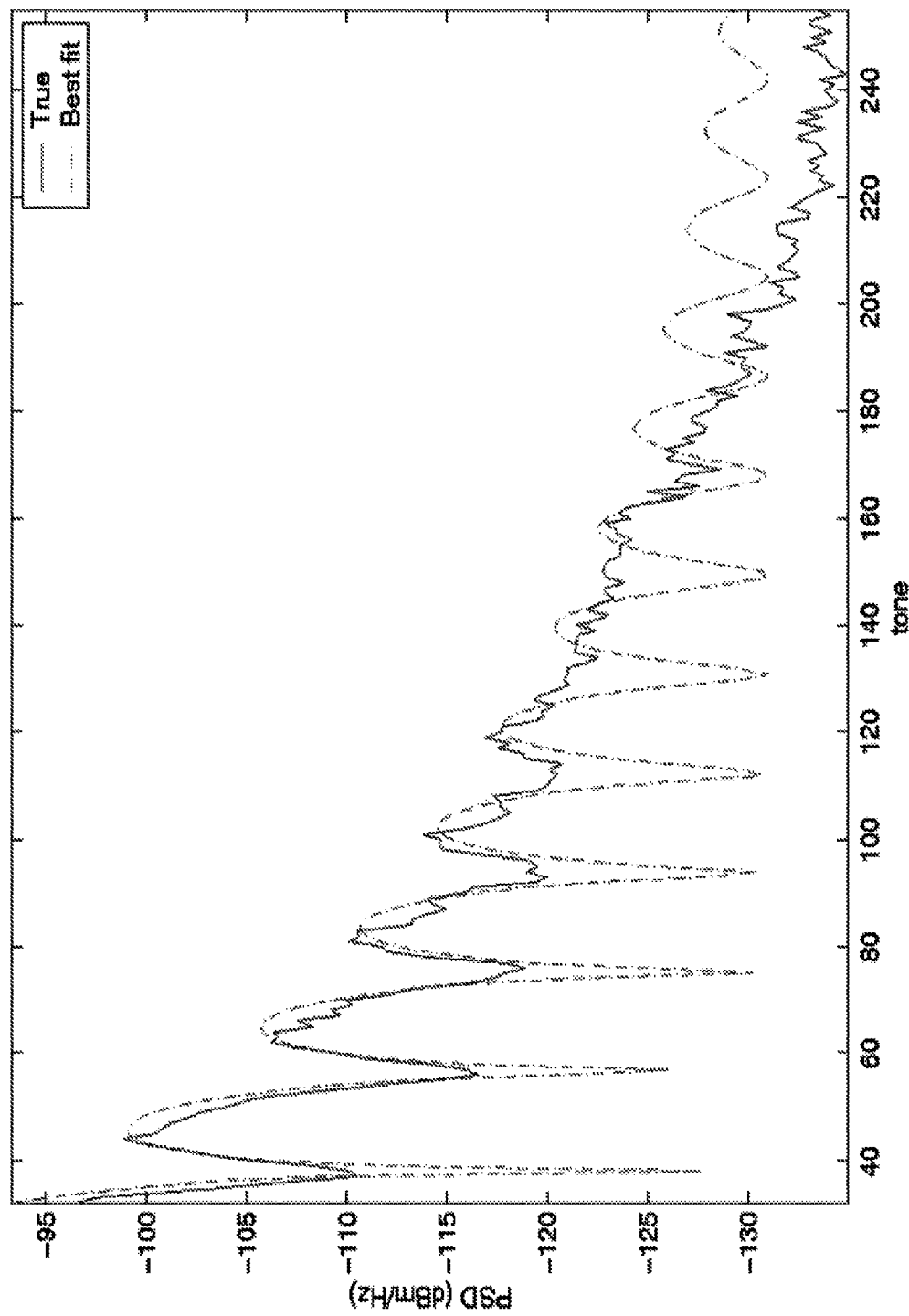
FIG. 9 illustrates an exemplary operation of the crosstalk detection process according to this invention.

An example of the operation of the crosstalk detection algorithm is illustrated in FIG. 9. The solid line is the measured PSD of the ICN versus the PSD of the crosstalk that best matches the observed data. The actual disturbance on the line was a DSL Next disturber with −35 dBm power and the crosstalk detection algorithm found exactly the same answer.

Figure 10:
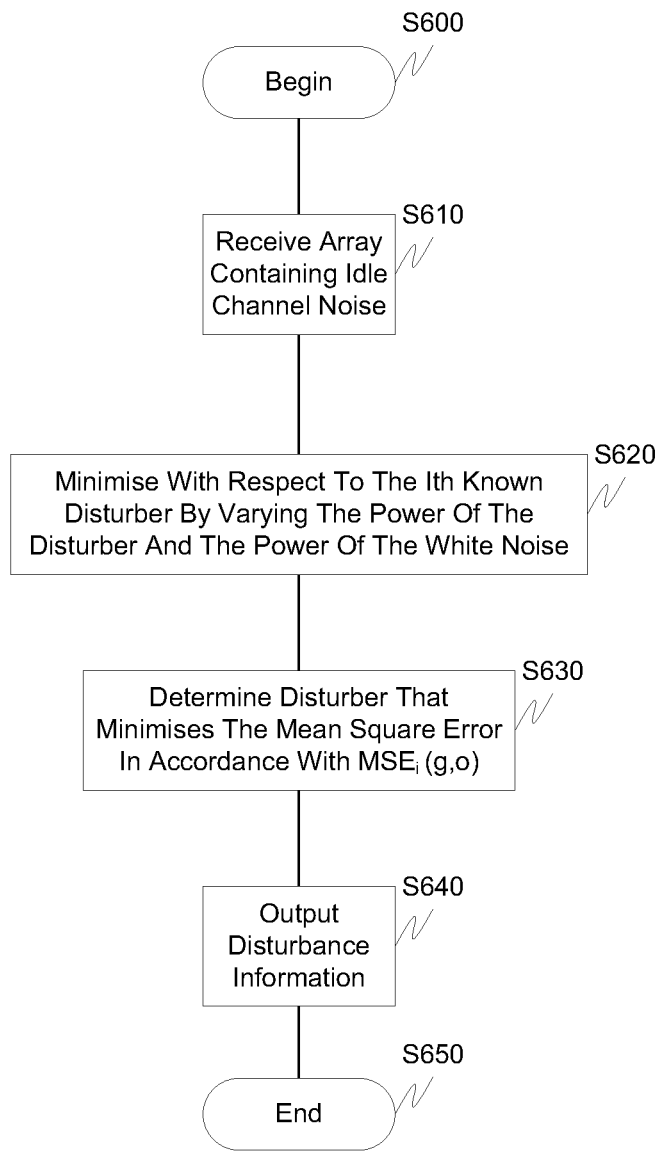
FIG. 10 illustrates an exemplary method of determining disturbance information according to this invention.

FIG. 10 illustrates an exemplary method of determining an estimation of the crosstalk. In particular, control begins in step S600 and continues to step S610. In step S610, an array containing the channel noise is received. Next, in step S620, minimization with respect to the $i^{th}$ disturber is accomplished by varying the power of the disturber and the white noise. Then, in step S630, the disturber that minimizes the mean square error in accordance with $MSE_i(g, \sigma)$ is determined. Control then continues to step S640.

In step S640, the disturbance information is output. Control then continues to step S650 where the control sequence ends.

An ADSL receiver is also susceptible to AM/EMI interference because a portion of the ADSL receive band coincides with the AM and the amateur broadcast frequencies. According to FCC specifications, the AM radio broadcast frequencies start at 540 kHz and extend up to 1.8 MHz. Beyond this frequency band, it is possible to find EMI ingress caused by the amateur radio broadcast in the bands from 1.9 MHz to approximately 3.3 MHz. Therefore, home wiring which connects the ADSL modem to the telephone line can acts as an antenna that detects one or more AM and/or EMI sources.

Figure 11:
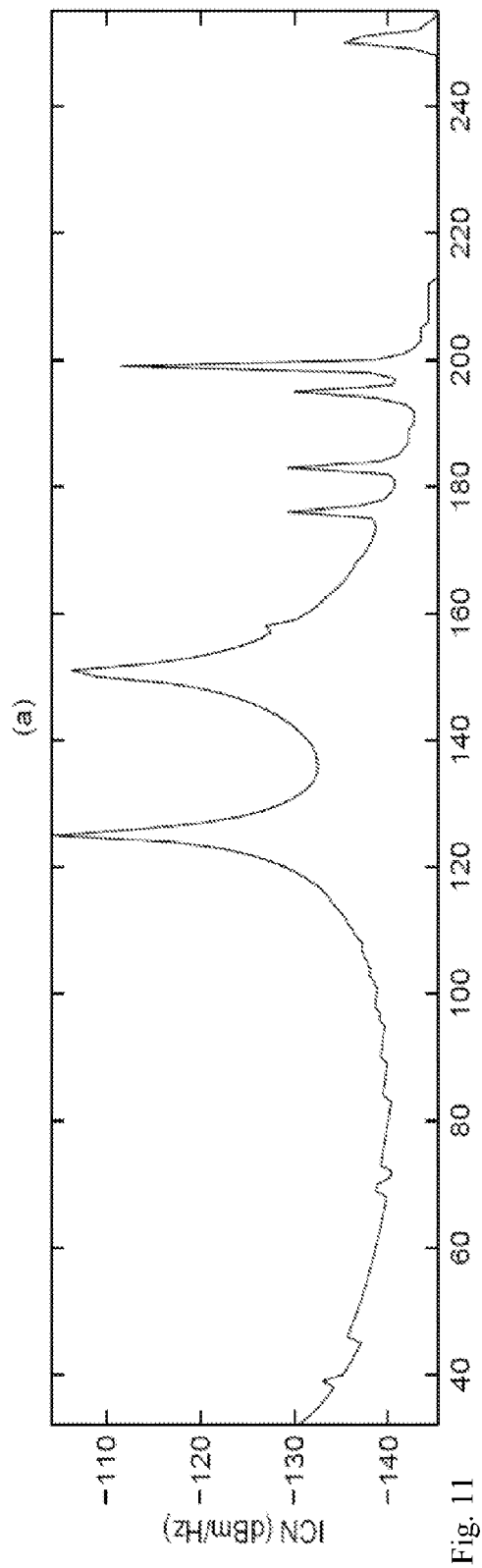
FIG. 11 illustrates an exemplary power spectrum of an AM/EMI interference pattern.

FIG. 11 illustrates an exemplary power spectrum of a typical AM/EMI interference pattern with multiple AM interferers. The AM broadcast was accomplished by modulating a baseband signal, such as a voice or music signal, by amplitude modulation. Denoting the baseband signal by f(t), with t being time, the modulation signal is given by:

$$e_m(t) = f(t)\cos(\omega_c t) + A \cos(\omega_c t)$$

where A is a constant and $\omega = 2\pi f_c$ is the radian carrier frequency. From the above equation, the spectrum of $e_m(t)$ consists of the baseband signal shifted in frequency by $\pm\omega_c$ plus two additional pulses at $\pm\omega_c$. Therefore, $$FFT(e_m(t)) = \frac{1}{2}[F(\omega - \omega_c) + F(\omega + \omega_c)] + \pi A[\delta(\omega - \omega_c) + \delta(\omega + \omega_c)]$$

The AM/EMI interference detection is complicated by the fact that the observed spectrum is dependent on the unknown spectrum of the time-varying baseband signal f(t) as illustrated above. Thus, the AM/EMI detection algorithm should use only the carrier frequency of the modulating wave as a signature. The AM/EMI interference frequency and power can be estimated by modeling the power spectrum of the AM/EMI as a constant background noise plus a number of spikes, parameterized by the frequency and height, representing the AM/EMI carrier frequencies. Next, the model is compared with the observed spectrum by varying the frequency and the height of each individual spike. The frequency/height configuration of the model best matching the original power spectrum in terms of mean square error is declared as the estimation.

However, since each spike is parameterized by two parameters, i.e., frequency and height, each additional AM/EMI disturber adds two more parameters to the optimization. If, for example, there are 10 AM/EMI disturbers, optimization would need to be performed over 20 parameters. This, in general, presents a very complicated optimization problem which may be difficult to solve in practice. However, analyzing the spectrum of the AM/EMI interferers, it is seen that the first derivative of the spectrum at carrier frequencies is not continuous. That is, at the carrier frequency, the slope of the spectrum jumps abruptly from a positive large number to a negative large number. Thus, the second derivative of the spectrum contains large negative pulses and these can be detected by establishing a negative threshold and determining the impulses whose heights are below the set threshold.

Figure 12:
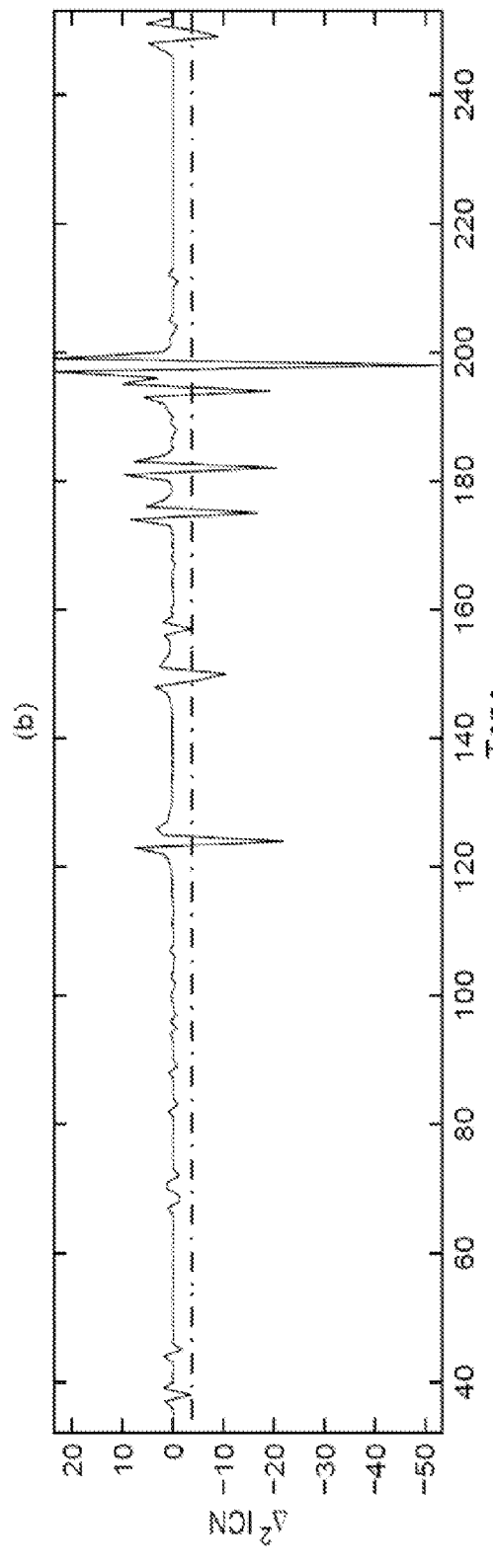
FIG. 12 illustrates the second derivative of the power spectrum of FIG. 11 determined in accordance with this invention.

FIGS. 11 and 12 illustrate the operation of the AM/EMI detection method. Specifically, FIG. 11 shows the power spectrum of the ADSL receiver band which contains a number of AM/EMI disturbers. FIG. 12 shows the second difference, which corresponds to the second derivative in continuous time of the power spectrum in FIG. 11. Large negative spikes at the points where the AM/EMI carrier frequencies are located can be observed. The carrier frequencies are detected by locating the points in FIG. 12 where the second difference exceeds a predetermined threshold, as illustrated by the dashed line. The power of each AM/EMI disturber is then estimated directly from the original power spectrum.

Figure 13:
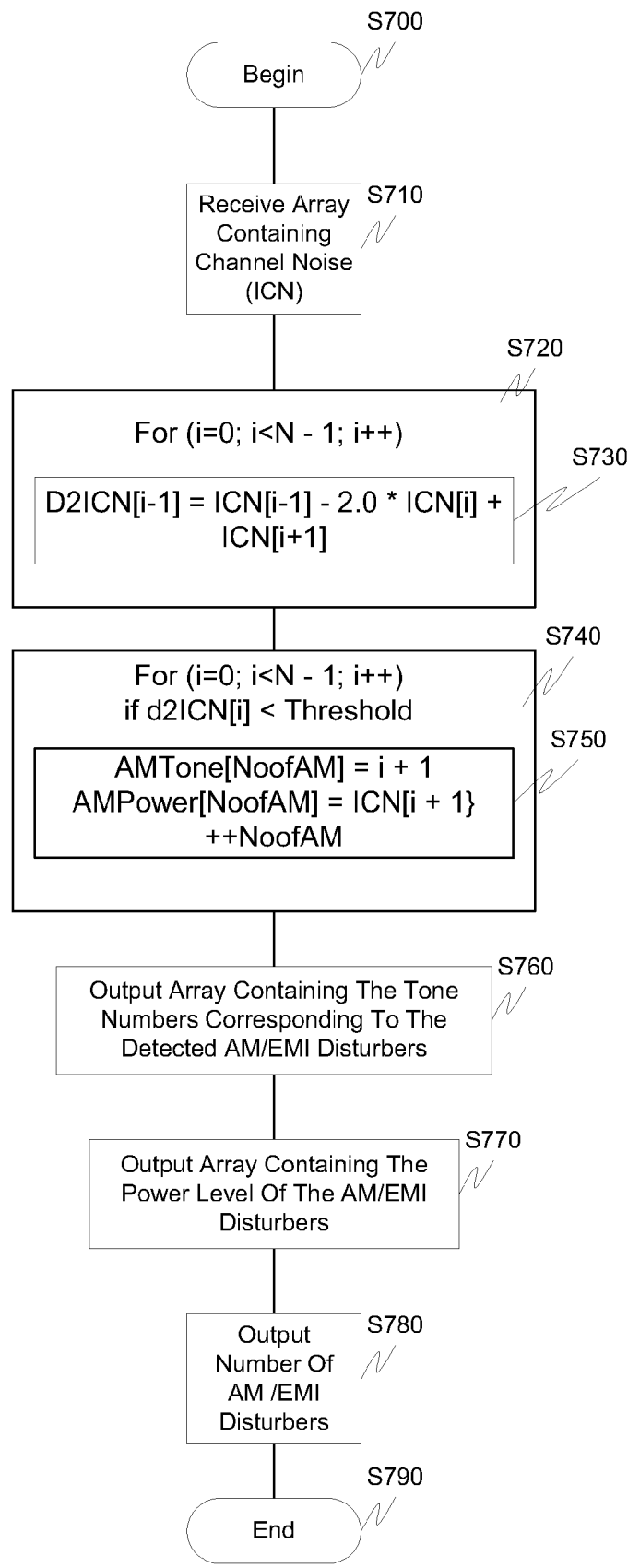
FIG. 13 illustrates an exemplary method of determining the number of AM/EMI disturbers according to this invention.

FIG. 13 illustrates an exemplary method of determining AM/EMI disturbers. In particular, control begins in step S700 and continues to step S710. In step S710, an array containing the channel noise is received. Next, in step S720, for a predetermined number of iterations, the second difference of the array containing the idle channel noise is determined in step S730. Then, in step S740, for a predetermined number of iterations, the carrier frequencies that exceed a predetermined threshold are detected. Control then continues to step S760.

In step S760, an array containing the tone numbers corresponding to the detected AM/EMI disturbers is output. Next, in step S770, an array containing the power level of the AM/EMI disturbers is output. Then, in step S780, the number of AM/EMI disturbers are output. Control then continues to step S790 where the control sequence ends.

Another function of the postprocessing and interpretation module 150 is to estimate the rate reduction caused by the presence of crosstalk and/or disturbers on the line. If the crosstalk and/or disturber detection method determines that there are noise sources other than the background white noise of the line, the method updates the available SNR tables, which can be obtained through either single-ended or double-ended diagnostics, or by reversing the SNR reduction caused by the disturbers. The methodology then runs a bit loading routine on the updated SNR table with a given margin, framing and coding information to determine the rates for a disturber free line. The difference between the actual and the estimated data rates gives the rate reduction caused by the noise sources. The SNR is determined in accordance with:

$$SNR(f_i) = 10\log_{10}\frac{|H(f_i)|^2}{S_{xx}(f_i)}$$

where $H(f_i)$ is the channel impulse response evaluated at the $i^{th}$ tone and $S_{xx}(f_i)$ is the power spectral density (PSD) of the noise on the line evaluated at the $i^{th}$ tone. If there are no noise sources of the line, except for the background white noise, the SNR equation could be simplified to:

$$SNR_{No-Disturber}(f_i) = 10\log_{10}\frac{|H(f_i)|^2}{\sigma^2}$$

where $\sigma$ is the standard deviation of the white noise. From the above equations, once a disturber is detected, the $SNR_{No-Disturber}$ can be determined given $S_{xx}(f_i)$, the actual PSD of the noise (ICN) and $\sigma$. Next, the bitloading routine is run on the $SNR_{No-Disturber}$ and the rate difference corresponding to the SNR and the $SNR_{No-Disturber}$ determined.

The method can use the existing bit loading routine for determining the estimated data rate for a disturber-free line. Therefore, the memory required to implement the method can be reduced.

Figure 14:
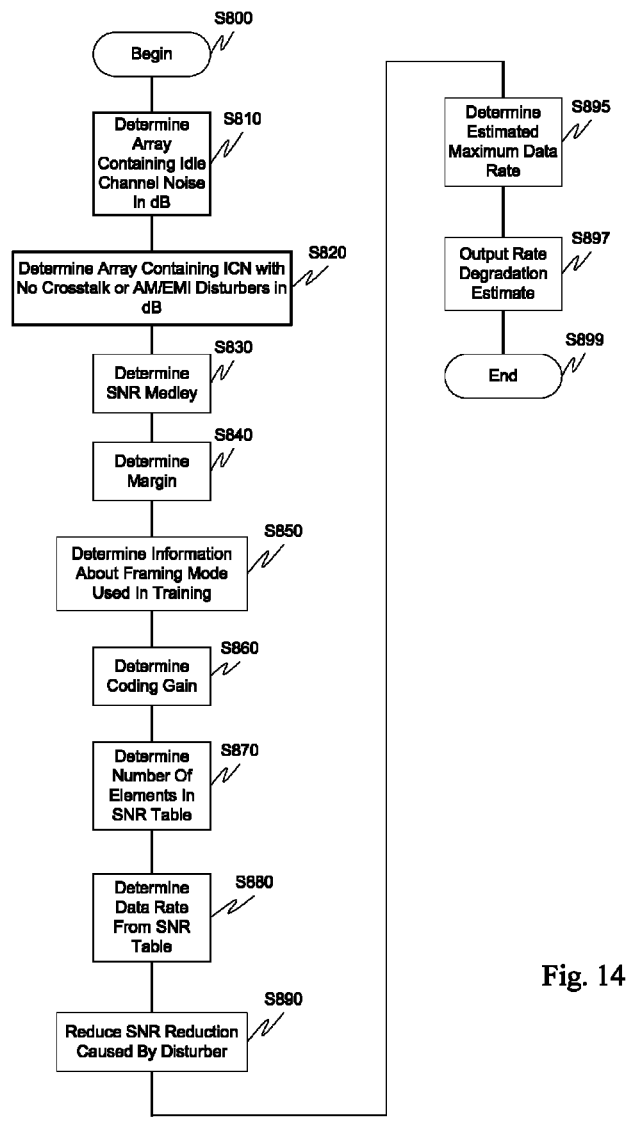
FIG. 14 illustrates an exemplary method of determining a rate degradation estimate according to this invention.

FIG. 14 illustrates an exemplary method for generating the rate degradation estimate. Specifically, control begins in step S800 and continues to step S810. In step S810, the array containing the idle channel noise is received. Next, in step S820, an array containing the ICN with no crosstalk nor AM/EMI disturbers is determined. Then, in step S830, the SNR medley is determined. Control then continues to step S840.

In step S840, the margin is determined. Next, in step S850, information about the framing mode that was used in training collected. Then, in step S860, the coding gain is determined. Control then continues to step S870.

In step S870, the number of elements in the SNR table is determined. Next, in step S880, the data rate is determined based on the SNR table. Then, in step S890, the SNR reduction caused by the disturber is reduced/eliminated. Control then continues to step S895.

In step S895, the estimated maximum data rate is determined. Next, in step S879, the rate degradation estimate is output. Control then continues to step S899 where the control sequence ends.

The TDR data is used to estimate the loop length and bridged tap lengths as discussed above. Additionally, the information extracted from the TDR interpretation method can be used to estimate the frequency domain channel impulse response $H(f_i)$. Furthermore, the PSD of the noise $S_{xx}(f_i)$ is known from the ICN measurements. Thus, the SNR can be estimated from these two quantities in accordance with:

$$SNR(f_i) = 10\log_{10}\frac{|H(f_i)|^2}{S_{xx}(f_i)}, i = i_s, \ldots, i_l$$

where $i_s$ and $i_l$ are the first and last tones over which the $S(f_i)$ is evaluated. The data rate is determined by running the bit-loading method on the estimated SNR with a given margin, framing and coding information. Since the rate estimation algorithm can use existing bitloading routines, again the memory requirements can be reduced.

Figure 15:
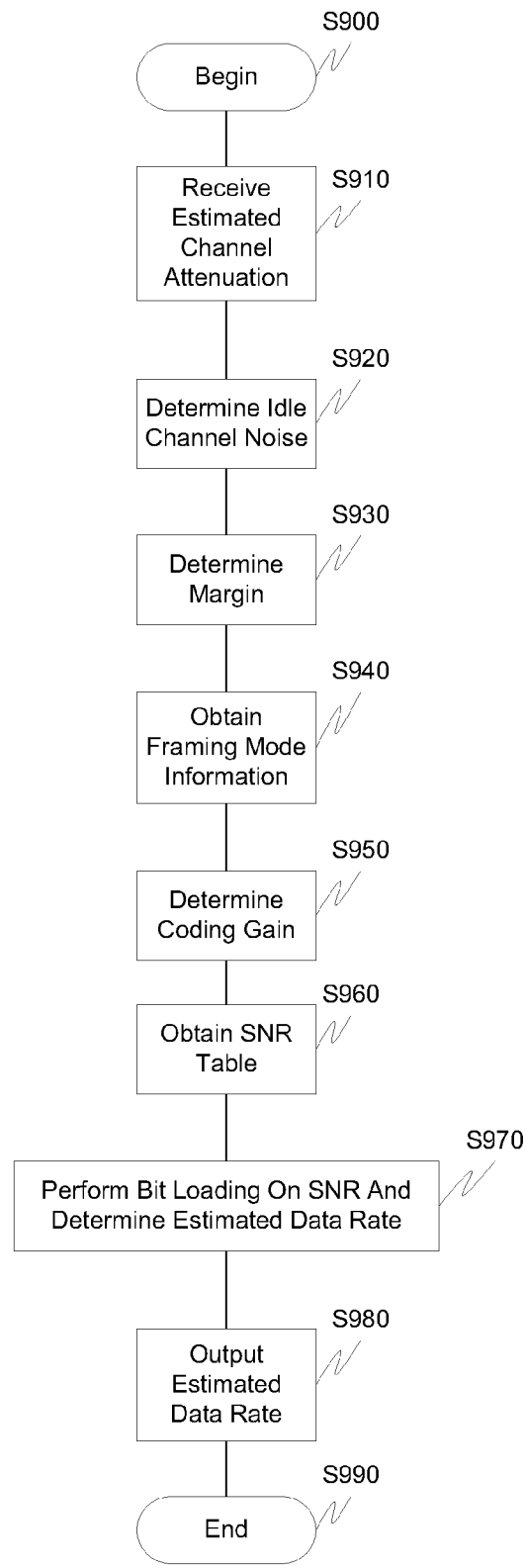
FIG. 15 illustrates an exemplary method of determining an estimated data rate according to this invention.

FIG. 15 illustrates an exemplary method of estimating the data rate. Specifically, control begins in step S900 and continues to step S910. In step S910, an estimate of the channel attenuation is determined. Next, in step S920, the idle channel noise is determined. Then, in step S930, the margin is determined. Control then continues to step S940.

In step S940, the framing mode information is obtained. Next, in step S950, the coding gain is determined. Then, in step S960, the SNR table is obtained. Control then continues to step S970.

In step S970, bit loading is performed on the SNR and an estimated data rate determined. Next, in step S980, the estimated data rate is output. Control then continues to step S990 where the control sequence ends.

As illustrated in FIG. 1, the line characterization system 100 can be implemented either on a single program general purpose computer, or a separate program general purpose computer. However, the line characterization system 100 can also be implemented on a special purpose computer, a programmed microprocessor or microcontroller and peripheral integrated circuit element, an ASIC or other integrated circuit, a digital signal processor, a hard-wired electronic or logic circuit such as a discrete element circuit, a programmable logic device such as a PLD, PLA, FPGA, PAL, a modem, or the like. In general, any device capable of implementing a finite state machine that is in turn capable of implementing the flowcharts illustrated in FIGS. 2-6, 8, 10 and 13-15 can be used to implement the line characterization system according to this invention.

Furthermore, the disclosed method may be readily implemented in software using object or object-oriented software development environments that provide portable source code that can be used on a variety of computer or workstation hardware platforms. Alternatively, the disclosed line characterization system may be implemented partially or fully in hardware using standard logic circuits or VLSI design. Whether software or hardware is used to implement the systems in accordance with this invention is dependent on the speed and/or efficiency requirements of the system, the particular function, and the particular software and/or hardware systems or microprocessor or microcomputer systems being utilized. The line characterization system and methods illustrated herein, however, can be readily implemented in hardware and/or software using any known or later-developed systems or structures, devices and/or software by those of ordinary skill in the applicable art from the functional description provided herein and a general basic knowledge of the computer and communications arts.

Moreover, the disclosed methods may be readily implemented as software executed on a programmed general purpose computer, a special purpose computer, a microprocessor, or the like. In these instances, the methods and systems of this invention can be implemented as a program embedded on a personal computer such as a Java® or CGI script, as a resource residing on a server or graphics workstation, as a routine embedded in a dedicated line characterization system, a modem, a dedicated line characterization system, or the like. The line characterization system can also be implemented by physically incorporating the system and method into a software and/or hardware system, such as the hardware and software systems of a line characterization system or modem, such as a DSL modem.

It is, therefore, apparent that there has been provided, in accordance with the present invention, systems and methods for characterizing line conditions. While this invention has been described in conjunction with a number of exemplary embodiments, it is evident that many alternatives, modifications and variations would be or are apparent to those of ordinary skill in the applicable arts. Accordingly, the invention is intended to embrace all such alternatives, modifications, equivalents and variations that are within the spirit and scope of this invention.

What is claimed is:

1. A communication line characterization method to determine characteristics of a communication line, comprising:
    receiving raw data from a remotely located multicarrier modem with a data collection module;
    interpreting, using a postprocessing and interpretation module and processor, the raw data received from the data collection module to determine characteristics of the communication line;
    performing a data rate reduction estimation by determining a difference between an actual data rate with one or more disturbances and an estimated data rate for a disturber-free line, wherein the data rate reduction is caused by one or more disturbances including one or more of crosstalk and disturbers on the communication line; and
    identifying the one or more disturbances on the communication line as at least one of an electromagnetic signal, an HDSL signal, an ADSL signal and a T1 signal.

2. The method of claim 1, further comprising outputting the identified disturbance.

3. The method of claim 1, wherein the remotely located multicarrier modem is a central office modem or a customer premises modem.

4. The method of claim 1, wherein the remotely located multicarrier modem is a DSL central office modem or a DSL customer premises modem.

5. The method of claim 1, wherein the communications line is a twisted pair communications line.

6. A communication line characterization system operative to determine characteristics of a communication line, comprising:
    a postprocessing and interpretation module and processor adapted to:
        receive raw data from a remotely located multicarrier modem with a data collection module and interpret the raw data received from the data collection module to determine characteristics of the communication line;
        perform a data rate reduction estimation by determining a difference between an actual data rate with one or more disturbances and an estimated data rate for a disturber-free line, wherein the data rate reduction is caused by one or more disturbances including one or more of crosstalk and disturbers on the communication line; and
        identify the one or more disturbances on the communication line as at least one of an electromagnetic signal, an HDSL signal, an ADSL signal and a T1 signal.

7. The system of claim 6, further comprising outputting the identified disturbance.

8. The system of claim 6, wherein the remotely located multicarrier modem is a central office modem or a customer premises modem.

9. The system of claim 6, wherein the remotely located multicarrier modem is a DSL central office modem or a DSL customer premises modem.

10. The system of claim 6, wherein the communications line is a twisted pair communications line.

11. A non-transitory computer-readable information storage media, having stored thereon instructions, that when executed by a processor, cause to be performed a communication line characterization method to determine characteristics of a communication line, comprising:
    receiving raw data from a remotely located multicarrier modem with a data collection module;
    interpreting, using a postprocessing and interpretation module and processor, the raw data received from the data collection module to determine characteristics of the communication line;
    performing a data rate reduction estimation by determining a difference between an actual data rate with one or more disturbances and an estimated data rate for a disturber-free line, wherein the data rate reduction is caused by one or more disturbances including one or more of crosstalk and disturbers on the communication line; and
    identifying the one or more disturbances on the communication line as at least one of an electromagnetic signal, an HDSL signal, an ADSL signal and a T1 signal.

12. The media of claim 11, further comprising outputting the identified disturbance.

13. The media of claim 11, wherein the remotely located multicarrier modem is a central office modem or a customer premises modem.

14. The media of claim 11, wherein the remotely located multicarrier modem is a DSL central office modem or a DSL customer premises modem.

15. The media of claim 11, wherein the communications line is a twisted pair communications line.

* * * * *